(12) United States Patent
Ridgel

(10) Patent No.: US 12,423,643 B2
(45) Date of Patent: Sep. 23, 2025

(54) AUTOMATED ITEM PREPARATION FOR SHIPPING SYSTEM AND METHOD

(71) Applicant: The Office BOSS, Inc., Truckee, CA (US)

(72) Inventor: Jeffrey Ridgel, Truckee, CA (US)

(73) Assignee: THE OFFICE BOSS, INC., Truckee, CA (US)

( * ) Notice: Subject to any disclaimer, the term of this patent is extended or adjusted under 35 U.S.C. 154(b) by 44 days.

(21) Appl. No.: 18/071,448

(22) Filed: Nov. 29, 2022

(65) Prior Publication Data
US 2023/0177452 A1 Jun. 8, 2023

Related U.S. Application Data

(60) Provisional application No. 63/285,961, filed on Dec. 3, 2021.

(51) Int. Cl.
| | |
|---|---|
| G06Q 10/0834 | (2023.01) |
| G06Q 10/0833 | (2023.01) |
| G06Q 20/18 | (2012.01) |
| G06Q 50/40 | (2024.01) |
| H04W 4/80 | (2018.01) |

(52) U.S. Cl.
CPC ... *G06Q 10/08345* (2013.01); *G06Q 10/0833* (2013.01); *G06Q 10/0834* (2013.01); *G06Q 20/18* (2013.01); *G06Q 50/40* (2024.01); *H04W 4/80* (2018.02)

(58) Field of Classification Search
CPC ......... G06Q 10/08345; G06Q 10/0833; G06Q 10/0834; G06Q 20/18
See application file for complete search history.

(56) References Cited

U.S. PATENT DOCUMENTS

| | | | |
|---|---|---|---|
| D302,798 S | 8/1989 | Wolff, Jr. | |
| 5,576,951 A | 11/1996 | Lockwood | |
| 6,477,514 B1 | 11/2002 | Gil et al. | |
| 9,174,758 B1* | 11/2015 | Rowley | ............... G05D 1/0212 |
| 10,410,166 B2 | 9/2019 | Rubinstein Apozdava | |
| 2003/0144971 A1* | 7/2003 | Das | ........................ G06Q 20/10 |
| | | | 705/401 |
| 2004/0236635 A1* | 11/2004 | Publicover | ......... G06Q 10/0832 |
| | | | 705/26.81 |
| 2014/0034727 A1* | 2/2014 | Hancock | ................ G06Q 50/60 |
| | | | 235/375 |
| 2017/0081067 A1* | 3/2017 | Aze | ........................ B65B 57/12 |
| 2017/0116571 A1* | 4/2017 | Tammattabattula | ........................ |
| | | | G06Q 10/0836 |
| 2018/0046978 A1* | 2/2018 | Tartal | ..................... G06Q 50/60 |
| 2018/0121865 A1* | 5/2018 | Rubinstein Apozdava | ................. |
| | | | G06Q 30/0283 |

(Continued)

OTHER PUBLICATIONS

CS 75-C Operation Manual, Aug. 1, 2018, Quantronix, Inc, Version 1.1 (Year: 2018).*

(Continued)

*Primary Examiner* — Resha Desai
*Assistant Examiner* — Danielle Elizabeth Zevitz
(74) *Attorney, Agent, or Firm* — BakerHostetler

(57) ABSTRACT

An automated system for preparing an item for shipping by a common carrier. The system can have several subsystems to interface with a customer, determine the dimensions and weight of the item, access various databases to prepare the item for storage and later pickup by common carrier. The system can be implemented in a self-service kiosk.

20 Claims, 19 Drawing Sheets

(56) References Cited

U.S. PATENT DOCUMENTS

2019/0095862 A1\* 3/2019 Kilzer .................. G05D 1/0088
2019/0139013 A1\* 5/2019 Strand .................... G06Q 20/18
2021/0209876 A1\* 7/2021 Jiang .................. G07C 9/00896

OTHER PUBLICATIONS

The IP.com Journal. (Jul. 11, 2011). Self service package volume calculator. InnovationQTM powered by ip.com prior art database. (Year: 2011).\*

\* cited by examiner

Weather for Truckee, CA 
Light snow, Overcast
32°F (0°C)

Form 3

10:03 AM
Mon, Oct 25

WELCOME TO THE OFFICE BOSS BRAND
SHIPPING KIOSK

RETURNING CUSTOMER ~791

TEST MODE  SETUP A KIOSK ACCOUNT ~792

793~ PROCEED AS GUEST   HELP ~794

Form 6    :42

RETURNING   CUSTOMER

SEARCH BY
☑ LAST NAME
☐ COMPANY NAME  ⎬ 800
☐ CUSTOMER ID

LAST NAME: [_____] ~802
PASSWORD: [_____] ~804

CANCEL

Form 5

CREATE NEW KIOSK ACCOUNT     :50

| COUNTRY: | UNITED STATES |
|---|---|
| NAME (1ST-LAST): | [ ] Last name |
| COMPANY NAME: | Company name |
| ADDRESS LINE 1: | Number and street name |
| ADDRESS LINE 2: | Additional address info |
| CITY: | City has to be in the selected state |
| STATE: | CALIFORNIA ∨ |
| ZIP: | Zip code has to match the selected city |
| PHONE: | (123) 456-7890  [Maps] |
| EMAIL: | name.last@example.com |

904

INSERT PASSWORD:
BLANK            ☐ SHOW PASSWORD
RETYPE PASSWORD:

900 { COUNTRY through EMAIL }
902 { INSERT PASSWORD through RETYPE PASSWORD }

INSERT CUSTOMER INFO
REQUIRED FIELDS:
- Last
- Retype_password
- Password
- Email
- Phone
- Zip
- City
- Address 1
- Name
- CLICK ___ MAPS BUTTON TO SHOW THE MAP OF SELECTED ADDRESS
- CLICK ___ MAPS BUTTON TWICE TO HIDE MAP

[CANCEL]

FIG. 9

| Form 9 |

KIOSK HELP PAGE

RETURNING CUSTOMER    USE YOUR KIOSK ACCOUNT TO LOAD YOUR CUSTOMER INFO INTO YOUR NEXT SHIPMENT

SETUP A KIOSK ACCOUNT    CREATE A KIOSK ACCOUNT TO SAVE YOUR CUSTOMER INFO FOR FUTURE SHIPMENTS

PROCEED AS GUEST    ONE TIME CUSTOMERS NEED TO ENTER ALL THEIR INFORMATION FOR THEIR SHIPMENT

HELP    THIS PAGE    | CLOSE |

FIG. 10

Form 2

☐ KIOSK SETTINGS  *1102*   *1104*   *1106*
⌒1100
GENERAL | RECEIPT LAYOUT | ACCOUNTS | STORE INFO

DESTINATION FOLDER
C:\Users\BOSS\Desktop\BOSS_KIOSK\Kiosk Shipping Database\

| CHANGE FOLDER | SOUND ○ ON  ◉ OFF |

EMAIL ACCOUNT
Example@email.com
supercopter

ENTER WAITING TIME (S)
55

ENTER KIOSK NAME
KIOSK1 - TOB

ENTER WEATHER CITY
TRUCKEE

DEFAULT STATE
CALIFORNIA ⌄

STATISTICS

PRINTERS
LABEL   ZDesigner GK420d ⌄   PRINT TEST
RECEIPT POS-80 ⌄            PRINT TEST

CLOSE APP

Monday, October 25 10:16 AM

| Form 1 - 3 | / | Form 7 |

PARCEL INFO

PARCEL INFORMATION:

- Length: 13 In
  33.02 cm
- Width: 12 In
  30.48 cm
- Height: 13 In
  33.02 cm
- Weight: 5.65 lb (5.00 lb 10.40 oz)
  2.56 kg
- Dim. Weight: 10.94 lb (10.00 lb 15.04 oz)
  4.96 kg

PRESS >NEXT< TO CONTINUE

:32

| VERIFY ADDRESS | TEST | ← BACK | → NEXT | ☒ CANCEL |

Form 10 :41

MEASURING DEVICE IN USE

PLEASE TRY AGAIN

PRESS ANY KEY TO CONTINUE

Monday, October 25 10:38 AM

| Form 1 - 6 |

RECEIPT SELECTION

ATTACH THE PRINTED LABEL TO YOUR PARCEL AND TAKE IT TO THE COUNTER

SELECT THE WAY YOU WANT YOUR RECEIPT:
- SENT TO YOUR EMAIL ADDRESS (DEFAULT)
- PRINTED HERE
- BOTH
- ADD QR CODE TO CARRIER TRACKING WEBSITE

MAKE YOUR SELECTION AND PRESS >NEXT< TO CONFIRM

☑ EMAIL
Example@email.Com
☑ PRINTED
☑ QR CODE

To Carrier Tracking Site

① — ② — ③ — ④ — ⑤ — ⑥ :47

[TEST]  [→ NEXT]

:52     Form 4     — 2000

SHIPPING TRANSACTION COMPLETE

⇒ MAKE SURE YOUR SHIPPING LABEL IS FIRMLY AFFIXED TO THE PARCEL ⇐

⇒ MAKE SURE THERE ARE NO OTHER SHIPPING LABELS ON THE PARCEL (BLACK THEM OUT) ⇐

⇒ DROP-OFF YOUR PARCEL AT THE SHIPPING COUNTER ⇐

PRESS ANY KEY TO START A NEW SHIPMENT. THANK YOU!

FIG. 20

AUTOMATED ITEM PREPARATION FOR SHIPPING SYSTEM AND METHOD

CROSS REFERENCE TO RELATED APPLICATIONS

This application claims benefit under 35 U.S.C. § 119(e) of Provisional U.S. Patent Application No. 63/285,961, filed Dec. 3, 2021, the contents of which is incorporated herein by reference in its entirety.

FIELD OF THE INVENTION

The invention relates generally to systems and methods for the processing of mail for shipment, and more specifically to automated kiosks accessed by the public for the preparation of parcels and other items for shipment.

BACKGROUND

The preparation for shipment of mail and other items for delivery by carriers such as the U.S. Postal Service, United Parcel Service brand delivery service, and Federal Express brand delivery service, for example, can be time consuming and often requires specialized knowledge and experience. Service outlets such as The Office Boss brand of office services, Postal Annex brand of office services, and Mailboxes Etc. brand of office services have long existed to assist customers with such preparations. Details such as proper packaging, postage, and addressing can involve detailed knowledge of the various shipping options, rules, regulations, company preferences, and other requirements necessary for smooth operation by the carriers. Such service can be labor intensive due to the large number of variables entailed. Consequently, when a large number of parcels need to be serviced quickly, such as during the holiday season, unwanted delays and backlogs inevitably occur.

Automated, self-service kiosks have long been available to help the general public to accomplish various tasks. For example, Gil et al. (U.S. Pat. No. 6,477,514) describes an automated system for preparing letters and packages for mailing. Once a package is ready for shipment, a platform tilts and the package drops down into a storage area. Lockwood (U.S. Pat. No. 5,576,951) describes a computerized self-service travel reservation system using various databases to provide various customer selection and payment options. Rubinstein Apozdava (U.S. Pat. No. 10,410,166) relies exclusively on an application on a user's mobile device to communicate with and provide input to a shipping station.

There is a need for an automated, standalone, self-service shipping preparation system which provides both an enhanced simplicity and efficiency of use to the general public, greater flexibility to accommodate the requirements of a plural number of carriers, accommodate greater variability in the shape and dimensioning of items being shipped, and properly handle and store packages for shipper pickup, among many other features.

SUMMARY

Embodiments include a system for the automated preparation of an item for shipping. Embodiments of the system comprising a kiosk; a computer housed in the kiosk; a data feedback device including a display physically housed within the kiosk and coupled to the computer for communicating instructions to a user on how to operate the system to process the item for shipping; a data entry device coupled to the computer for receiving input from the user to operate the system to process the item for shipping; an item properties measurement subsystem within the kiosk and coupled to the computer for generating an item properties record; a printer housed in the kiosk capable of printing a label associated with the item; a computer program run on the computer that determines a shipping rate for the item responsive to the item properties record and controls the printer to print the label; and an automated item storage and retrieval subsystem contained within the kiosk for storing the item.

In the embodiments, wherein the item properties measurement subsystem including: an item dimension measurement unit; and a scale.

In the embodiments, wherein the automated item storage and retrieval subsystem identifies and locates the item among other items for pick up by a carrier or a customer.

In the embodiments, wherein the automated item storage and retrieval subsystem stores each item in a physically separate and uniquely identified area within a storage matrix.

In the embodiments, further comprising an automated labeler for affixing the label to the item prior to storage.

In the embodiments, wherein the computer communicates with a mobile device to supplement the data feedback device and the data entry device.

In the embodiments, further comprising a near field communication device coupled to the computer, wherein the near field communication device communicates with the mobile device.

In the embodiments, wherein the computer program provides a notification to a carrier selected by the user among a plurality of carriers when the item is ready for pickup.

In the embodiments, further comprising a second printer housed in the kiosk capable of printing a receipt including a tracking code for tracking the item during shipping.

Embodiments include a system for the automated preparation of a three-dimensional item for shipping, the system comprising: a housing; a customer interface system including a customer interface terminal physically housed with the housing and adapted to receive customer inputs;

a database accessible by the customer interface system; an item properties measurement system including: a three-dimensional item measurement unit capable of generating an item dimensional properties data record; and, a scale capable of generating an item weight data record; and, an automated item storage and retrieval system for storing the item within the housing.

In the embodiments, wherein the automated item storage and retrieval system identifies and locates the item among other items for pick up by a carrier or a customer.

In the embodiments, wherein the automated item storage and retrieval system stores each item in a physically separate and uniquely identified area within a storage matrix.

In the embodiments, further comprising an automated labeler for affixing the label to the item prior to storage.

In the embodiments, wherein the customer interface system communicates with a mobile device to supplement the customer interface terminal.

In the embodiments, further comprising a near field communication device coupled to the customer interface system, wherein the near field communication device communicates with the customer mobile device.

In the embodiments, further comprising a computer program run on a computer providing operational control for the customer interface system, the item properties measurement system and the automated item storage and retrieval system, wherein the computer program calculates a rate based on a ship to location input to the customer interface system, the item dimensional properties data record and the item weight data record.

In the embodiments, wherein the computer program provides a notification to a carrier selected by the user among a plurality of carriers when the item is ready for pickup.

In the embodiments, further comprising a second printer housed in the kiosk capable of printing a receipt including a tracking code for tracking the item during shipping.

Embodiments include a method for preparing a three-dimensional item for shipping by a common carrier, the method comprising: accepting an item for shipment into a computerized self-service kiosk; automatically measuring the item within the kiosk to determine a dimensioning and weight; receiving a destination, a carrier selection, and a rate selection in a user interface subsystem within the kiosk; recording an item data record including the dimensioning, the weight, the destination, the carrier selection, and the rate; automatically printing a label associated with the item and responsive to the item data record; and automatically storing the item within the self-service kiosk for retrieval by a carrier associated with the carrier selection.

In the embodiments, wherein the receiving including: receiving from a mobile device running a software application capable of accepting the destination, the carrier selection, and the rate selection; and, wirelessly communicating between the mobile device and the user interface subsystem.

BRIEF DESCRIPTION OF THE DRAWINGS

FIG. 9 is an exemplary new account registration form page of the customer interface station.

FIG. 10 is an exemplary help page of the customer interface station.

FIG. 11 is an exemplary administrative management area page of the customer interface station.

FIG. 12 is an exemplary customer information form page of the customer interface station.

FIG. 13 is an exemplary parcel destination form page of the customer interface station.

FIG. 14 is an exemplary parcel information display page of the customer interface station.

FIG. 15 is an exemplary notification page of the customer interface station.

FIG. 16 is an exemplary carrier and rate selection page of the customer interface station.

FIG. 19 is an exemplary receipt selection page of the customer interface station.

FIG. 20 is an exemplary shipping transaction complete page of the customer interface station.

DESCRIPTION OF THE EXEMPLARY EMBODIMENTS OF THE INVENTION

In this specification, the references to top, bottom, upward, downward, upper, lower, vertical, horizontal, sideways, lateral, back, front, proximal, distal, etc., can be used to provide a clear frame of reference for the various structures with respect to other structures usually as oriented in the referenced drawing. These references should not be treated as absolutes when the frame of reference is changed, such as when an object is inverted, shown on its side, or disassembled.

If used in this specification, the term "substantially" can be used with respect to manufacturing imprecision and inaccuracies that can lead to non-symmetricity and other inexactitudes in the shape, dimensioning, orientation, and positioning of various structures. Further, use of "substantially" in connection with certain geometrical shapes and orientations, such as "parallel" and "perpendicular", can be given as a guide to generally describe the function of various structures, and to allow for slight departures from exact mathematical geometrical shapes, such as cylinders, disks and cones, and their orientations, while providing adequately similar function. Those skilled in the art will readily appreciate the degree to which a departure can be made from the mathematically exact geometrical references.

If used in this specification, the word "axial" is meant to refer to directions, movement, or forces acting substantially parallel with or along a respective axis, and not to refer to rotational nor radial nor angular directions, movement or forces, nor torsional forces.

In this specification, the units "millimeter" or "millimeters" can be abbreviated "mm", "centimeter" or "centimeters" can be abbreviated "cm".

The terms "vendor" and "carrier" as used herein are interchangeable.

Figure 1:
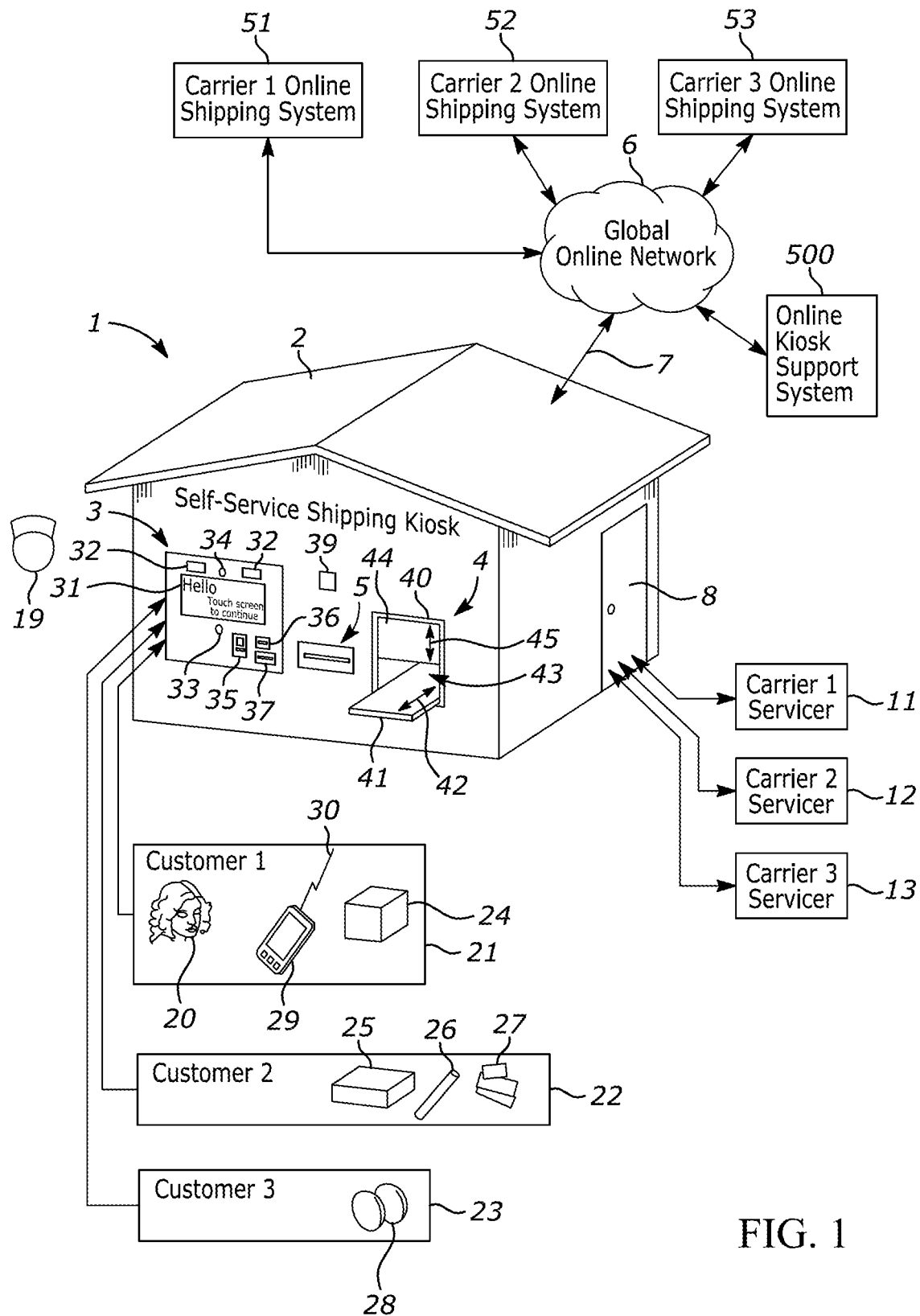
FIG. 1 is a block diagram and perspective view of a self-service kiosk for preparing an item for shipment according to an exemplary embodiment.

Referring now to the drawing, there is shown in FIG. 1 a self-service kiosk 1 for the automated self-service shipping preparation of one or more variously shaped items according to an exemplary embodiment of the invention. While the kiosk 1 is referred to as a kiosk, it may be more substantial than a typical self-service kiosk that one might find in a library or airport or hotel and include sufficient room for storing a number of processed packages awaiting pickup. The kiosk can also be less substantial and mounted on a mobile platform, such as a trailer or truck bed, so that it may be moved to and used at different venues. In addition to providing shipping preparation services, additional items could also be made available for purchase through the kiosk, such as boxes, tape, vendor specific flats, envelopes, postage, etc.

The kiosk may therefore include a stand-alone enclosure 2 housing various components of an automated self-service item shipping preparation system as will be described herein. The kiosk can provide one or more of a customer interface station 3, one or more of an item acceptance and dispensing station 4, and one or more of a flats acceptance station 5 all under the control of one or more computers within the kiosk running software for the management of the operation of the substations, and shipment-related information management. Communication with an off-site online kiosk support system 500 including one or more servers running computerized management software and providing database support, and with the online systems of one or more common carriers 51, 52, 53 can be accomplished through a broadband link 7 to a global computer network 6 such as the Internet. Physical access to the internal mechanisms of the kiosk, and items ready to be retrieved by service personnel 11, 12, 13 from the carriers, can be through a controlled access doorway 8. Alternately, items can be dispensed to a carrier servicer through the item acceptance and dispensing station 4.

Each of a plural number of customers 21, 22, 23 can access the system via the customer interface station 3 operating a customer interface subsystem as will be described herein. Each customer can be a human person 20 or other entity such as a company employing a human person to interact with the kiosk so as to facilitate the shipping of one or more items. As further explained in reference to FIG. 8, a customer can be a new customer that provides new information through the customer interface station 3 or a returning customer that can access information already stored by a computer operating the customer interface station 3 or enter new information to be used for shipping one or more items. A first customer 21 can have a single item 24 such as a parcel in the form of a quadrangular box to be shipped. A second customer 22 can have five items include a quadrangular box 25, a cylindrical tube 26 for mailing rolled paper, such as blueprints, and three envelopes 27 known as flats. A third customer 23 can have a single oddly shaped item 28 to be shipped such as a demonstration piece of artwork formed by a pair of joined ellipsoids. Each customer 21, 22, 23 can successively use the kiosk 1 to complete a shipping preparation transaction.

The customer interface station 3 can include a number of data entry and feedback devices such as an integrated touch screen display 31 (or alternatively or in addition a keyboard, mouse/trackball and monitor), audio speakers 32, microphone 33, camera 34, a near field communication (NFC) device and/or credit card reader 35 for accessing a customer's mobile phone, credit card, or other source for providing or exchanging customer information (including identification of a returning customer), a paper receipt dispenser 36, and a paper label dispenser 37 for producing a shipping label which the customer can affix to the item being shipped, for example. The touch screen display 31 can include a retinal scanner and/or a fingerprint scanner for user recognition and secure account login. The touch screen display 31 can also include advertising when not being used for shipping preparation or other uses, or the advertising can be displayed at the same time as shipping preparation information. Training and interactive coaching can also be provided, and other features can be provided, such as a way to track a item that has been shipped or is expected to be delivered (i.e., "where's my parcel?")

Some combination of the audio speakers 32, microphone 33 and camera 34 can facilitate voice recognition for data entry and shipment selection. The customer interface station 3 and/or the kiosk enclosure 2 can also include one or more far-field devices 39 to determine the proximity of a user to the kiosk and the physical shipping store in which the kiosk is located. A virtual reality headset 19 and corresponding software environment can also be used for customer input and interaction.

The first customer 21 can initiate a shipping preparation transaction by interacting with the customer interface station 3. During the transaction the customer can approach the item acceptance and dispensing station 4 and place their item to be shipped 24 through an automated item acceptance and dispensing portal 40 including a shelf 41 which can extend and retract 42 through a window 43 in the kiosk enclosure 2. The window can be sealed by a security gate 44 which can open and close 45 to allow the shelf to extend and accept the item being shipped.

During the transaction the item 24 to be shipped can be withdrawn through the item portal 40 into the kiosk 1 and automatedly measured by the item measurement subsystem as will be described herein. The customer can continue the transaction at the customer interface station 3 to adjust various parameters associated with the shipment as described herein. Once all the parameters have been set, a shipping label can be printed and dispensed as a peelable sticker to the customer through the paper label dispenser 37. The item can then be returned through the portal to allow the customer to affix the printed label upon the item. Alternately, the shipping label, which can include a tracking number, a transaction number and other pertinent shipping data for reference, can be attached automatically or otherwise printed on the item by a printer associated with the item portal hardware or the item storage and retrieval system described herein. The item can then be retracted through the portal and placed in a location within the kiosk using the storage and retrieval system, as will be described herein, for later pickup by one of the carriers 11, 12, 13.

At the conclusion of the transaction the customer can receive a virtual receipt on their phone 29 and/or a printed receipt from the paper receipt dispenser 36. The receipt can include a barcode such as a QR code which allows the customer to rapidly access their account in future transactions or to conduct a status check at a kiosk. The receipt may also include the tracking number, transaction number and other pertinent shipping data for reference.

When the second customer 22 uses the kiosk, the envelopes 27 can be processed using the flats acceptance station 5 controlled by the flats subsystem as described herein. Alternately, the flats can be processed using the item portal 40 and item measurement subsystem adapted to process flats.

Further, it shall be understood that many of the functions of the customer interface station 3, such data input, form selection/completion, carrier/rate selection, etc., can be accomplished through an app running on the customer's personal smart phone 29 and linked to the customer interface terminal computer using a wireless communication link 30 to the global computer network 6, or through wireless protocols established between the phone and the NFC device 35.

Optionally, the disclosed kiosk can operate as a shipped item delivery station where customers or other users can receive and pickup mail and packages. In this operation a customer can access their account at the customer interface station 3 or via their app on their mobile device 29. The customer can enter a code and have their item dispensed through the item portal 40. Once the proper verifications have been made, the appropriate item can be retrieved from the storage matrix as further explained herein and dispensed for customer pickup.

Figure 2:
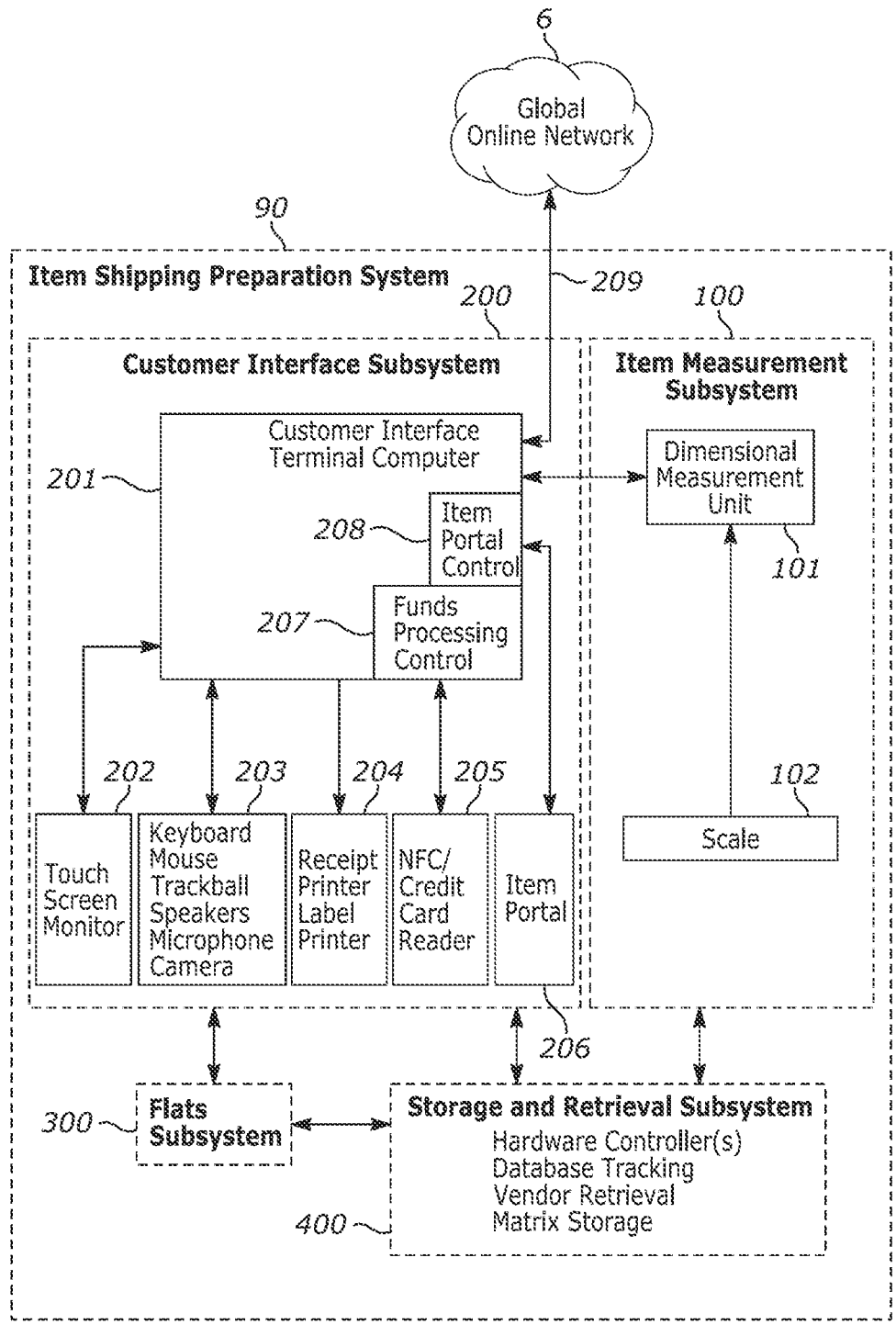
FIG. 2 is a block diagram of the primary components of an automated system for preparing an item for shipment implemented in the kiosk.

Referring now to FIG. 2, the automated item shipping preparation system 90 can include four subsystems, such as an item measurement subsystem (MS) 100, a customer interface subsystem (CIT) 200, a flats subsystem (FS) 300, and a storage and retrieval subsystem (SAR) 400.

The item measurement subsystem (MS) 100 can incorporate a dimensional measurement unit 101 which includes a mechanism for determining the physical dimensions of the item as well as a scale 102 for determining its weight. Various devices are commercially available for detecting the dimensions of an item. One such device is an optical image analysis type device available from Quantroniz, Inc., of Farmington, Utah, and sold under the brand name Cubiscan CS-75. Another device available from Quantroniz, Inc. is the Cubiscan 110 brand which uses ultrasound scanning to determine item dimensions. Laser-based or LED-based three-dimensional scanning-type devices are also available. A scale can be used to determine the weight of the item being mailed. The result of these measurements is the creation of one or more data records including values for the weight and item dimensioning which can be stored and updated in an item database. If the item has dimensions or a shape outside acceptable ranges for the preparation system or the carriers, the customer can be notified and given instruction on how the item may be shipped. For example, FIG. 20, which provides a customer with instructions on how to affix the shipping label, to remove or black out any other labels, and to take the parcel to a shipping counter, illustrates a shipping transaction complete page 2000 that may be appropriate for items that cannot be automatically labeled and physically shipped through the kiosk 1.

The customer interface subsystem 200 can include several components including a computer 201 such as a standard personal computer running software for operating and integrating the other components and devices with the system 90 as will be described herein. For example, the dimensional measurement unit 101 can also utilize software on the computer 201 to automate the entire process of measuring the dimensions and weight of a package or flat to be shipped. The kiosk software running on the computer 201 can also provide the user interface of the display, perform data collection and dissemination, manage communication with the global online network and with customers, provide vendor status and tracking processes and information, operate any of the input/output components discussed herein, interface and communication with all system components (including each of the subsystems, the doors and windows, the conveyors, pneumatics, and motor controllers, etc.), provide an application programming interface with vendors for shipping details, tracking numbers, pricing information, etc., and provide for overall system health and recovery.

Other input/output components of the customer interface subsystem 200 can include: a touch screen type display monitor 202, such as integrated touch screen display 31; various optional data entry and feedback devices 203 such as a keyboard, keypad, mouse, trackball, audio speakers, microphone, and camera; printers 204 such as the receipt and label printers; various scanners or communicators 205 such as a near field communication (NFC) device, a far field device, and a credit card reader, for accessing a customer's mobile phone, credit card, or other source for providing or exchanging customer information as well as locating the customer; as well as the item portal 206 for accepting the item to be shipped from the customer, and potentially returning or delivering the item to the customer. Operation of the scanners and portal can require additional hardware components associated with the computer 201 such as a funds processing control module 207 and an item portal control module 208. The customer interface subsystem can link to the off site online kiosk support system 500 as will be described herein, and various other databases located on a global computer network 6 such as the Internet through an ethernet link 209 or other standard electronic communication protocol.

It shall be understood that the system can accommodate several customer interface stations 3 having separate customer interface terminal computers collocated at a single kiosk having a single measurement subsystem 101. The number of customer interface terminals can depend on location space and customer volume throughput requirements.

A role of the customer interface terminal computer 201 can be to provide an interface for the customer, provide a software driven series of events guiding the customer through the shipping preparation process as further illustrated in FIGS. 7-20, and to run the kiosk support system software routines.

The flats subsystem (FS) 300 can utilize the item portal 40 and/or the flats acceptance station 5 which can utilize a separate electro-mechanical device that conveys, and physically transports the flats such as envelopes into the kiosk, while reading their orientation, placing a shipping label and conveying the flat to the storage and retrieval subsystem 400 as will be described herein. This device can perform the same function as the item measurement subsystem 100, but specifically for carrier supplied flats, such as US Postal Service Express Mail brand envelopes, and FedEx brand flats, for example. In addition to determining orientation of a flat, the flats subsystem 300 can scan the flat to determine the vendor, which is often preprinted on vendor flats, and determine the size and weight to verify that the flat can be accepted for shipping and to determine the shipping rates. The flats subsystem 300 can further create and auto-attach an appropriate shipping label and any other labels, as more fully described herein, and also move the flat to the storage and retrieval subsystem for vendor-specific input and recovery as further described herein. The flats subsystem can also scan and auto-attach postage and labels to letter, determine weight/dimensions, determine whether additional postage for non-machine postal processing letters is required, reject inappropriate items, etc. Alternatively, a separate letter subsystem that is similar to the flats subsystem can be incorporated into the system 90.

The storage and retrieval subsystem 400 receives items (i.e., packages, flats and letters) that are ready for shipping and automatically applies the printed shipping (or other) label to the item and causes all of the collected data associated with the item (i.e. customer data, ship to information, dimensional data, weight, shipping carrier, pricing and shipping details, dates, times, parcel images, customer image, and exact details regarding the location of the stored item) to be stored as the item is in route to its storage location. As that collected data is being stored, notices are sent via the selected carrier's online shipping system 51, 52, 53 (such as through email or a direct connection) regarding the item's location and status. A carrier's employee/driver can then access the kiosk 1, login via the customer interface subsystem using a security code (either provided with the notice or once the carrier has logged into the kiosk) and password (either provided by the notice or after login), have their image collected, and retrieve all items scheduled for shipment by that carrier. Collected data, including item dissemination status, time, date and carrier, can be collected and a notification (via email or text or other form of communication) can be sent to the customer indicating the item's status and tracking number. Alternatively, carriers can communicate with the kiosk via an application running on a mobile device, through which security codes and passwords may be entered, and where item storage status checks, notes associated with items being shipped can be added, and item recovery operations can be performed.

Items that have been delivered by a vendor or another customer to the kiosk 1 may be collected by a customer in the much the same way, i.e., by providing a security code and password. Notifications may also be sent in a similar manner. In addition to real-time tracking and storing information about where current items are located in storage, the system 90 can track the same historical information on every item that has been processed (shipped or received) and store that on the global online network 6, which may be a cloud-based system.

Figure 3:
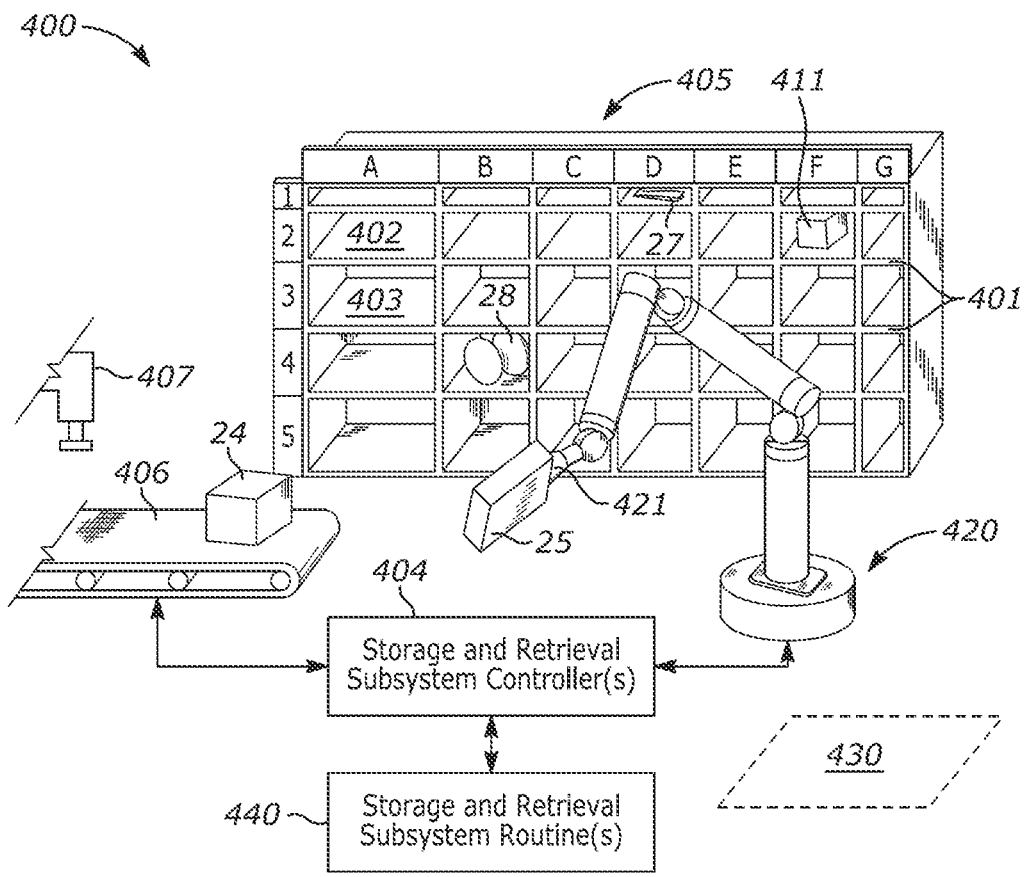
FIG. 3 is a block diagram and perspective view of the primary components of an automated item storage and retrieval subsystem as implemented in the kiosk.

As shown primarily in FIG. 3, the item storage and retrieval (SAR) subsystem 400 can accept items such as parcels 24, 25, 28, 411 from the item measurement subsystem 100 and flats such as envelopes 27 (or letters) from the flats subsystem 300 (or a letters subsystem) for storage and later retrieval by carrier servicing personnel 11, 12, 13. The SAR subsystem 400 can use a type of storage known as matrix storage. Matrix storage can be a software-driven storage regime that uses a matrix of individually located physical storage bins arranged in a two-dimensional array, such as a number of shelves 401 subdivided into cubicles 402, 403, and arranged in a convenient two-dimensional array 405 where each row is given a number and each column is given a letter. For example, a single cubicle 403 can be identified according to its row and column, namely 3A. The software can update an item database as described herein with the location of each item in the array. During a retrieval operation, the system can locate the item in its cubicle and can conduct an automated fetch of the items from the array and place the item in a retrieval area 430 for pick up by the carrier or place the item on conveyor 406 for delivery through item portal 40. Thus, when a carrier services the kiosk, the SAR subsystem can retrieve and authorize dispersal of all appropriate outgoing items to that carrier.

Each item can be placed into and fetched from the array 405 using an automated hardware system such as a conveyor 406 for carrying items from the item acceptance and dispensing station 4 (or for dispersal) coupled to the item measurement subsystem 100 and flats subsystem 300. If labels are to be automatically attached to the package, that can be performed by an adjustable electro-mechanical labeling system 407, while the package is on the conveyor 406. Labels can be automatically attached as part of the item shipping preparation system using one or more adjustable electro-mechanical labeling systems, such as a Legacy LS6000 brand all-electric labeler from Foxjet of St. Charles, Missouri. An articulating robotic arm 420 can be used to grasp an item from the conveyor and place it in an appropriate, typically empty cubicle. The conveyor and arm can be operated by one or more hardware controllers 404 managed by one or more SAR routines 440 running on a computer such as the customer interface subsystem computer 201.

The robotic arm 420 can carefully collect an item, such as item 24, from the conveyor 406 and place it in the array 405 and carefully fetch an item, such as item 25, from the array 405 and place it back on the conveyor to be retrieved through the item acceptance and dispensing station, or onto the carrier retrieval area 430 within the kiosk. The arm can use a vacuum grasping head 421 for grasping most quadrangular cardboard parcels. However, other types of grasping heads such as pincher-type heads, scoops, clamping fingers, hooked probes, all of various sizes, or other well-known grasping heads can be automatically swapped onto the distal end of the robotic arm depending on the item being moved as determined by the item measurement subsystem.

Alternately, each item can be transported within the SAR subsystem by hydraulic and conveyor belt mechanisms using a well-known cube sorter-tube type mechanism. The cube sorter can be an electro-mechanical sorting platform operating in a two-dimensional vertical plane aligned with the array 405. A pneumatic driven platform, carrying the given item, can move in an X-Y motion to a given storage cubicle position, then deposit the item in that cubicle. Upon a retrieval request, the opposite procedure can be performed in which the cube sorter moves the appropriate X-Y plane location and the item is extracted from the storage cubicle to a temporary sorter container, then subsequently moved to an item retrieval position for deposit onto a gravity feed ramp to be collected by the carrier service person.

As shown in the drawing, the cubicles A1 through G5 can be of varying sizes to accommodate variously sized items. For example, flats or small envelopes can be placed in the top row A1-G1, whereas the bulkiest items can be placed in cubicle A5.

Figure 4:
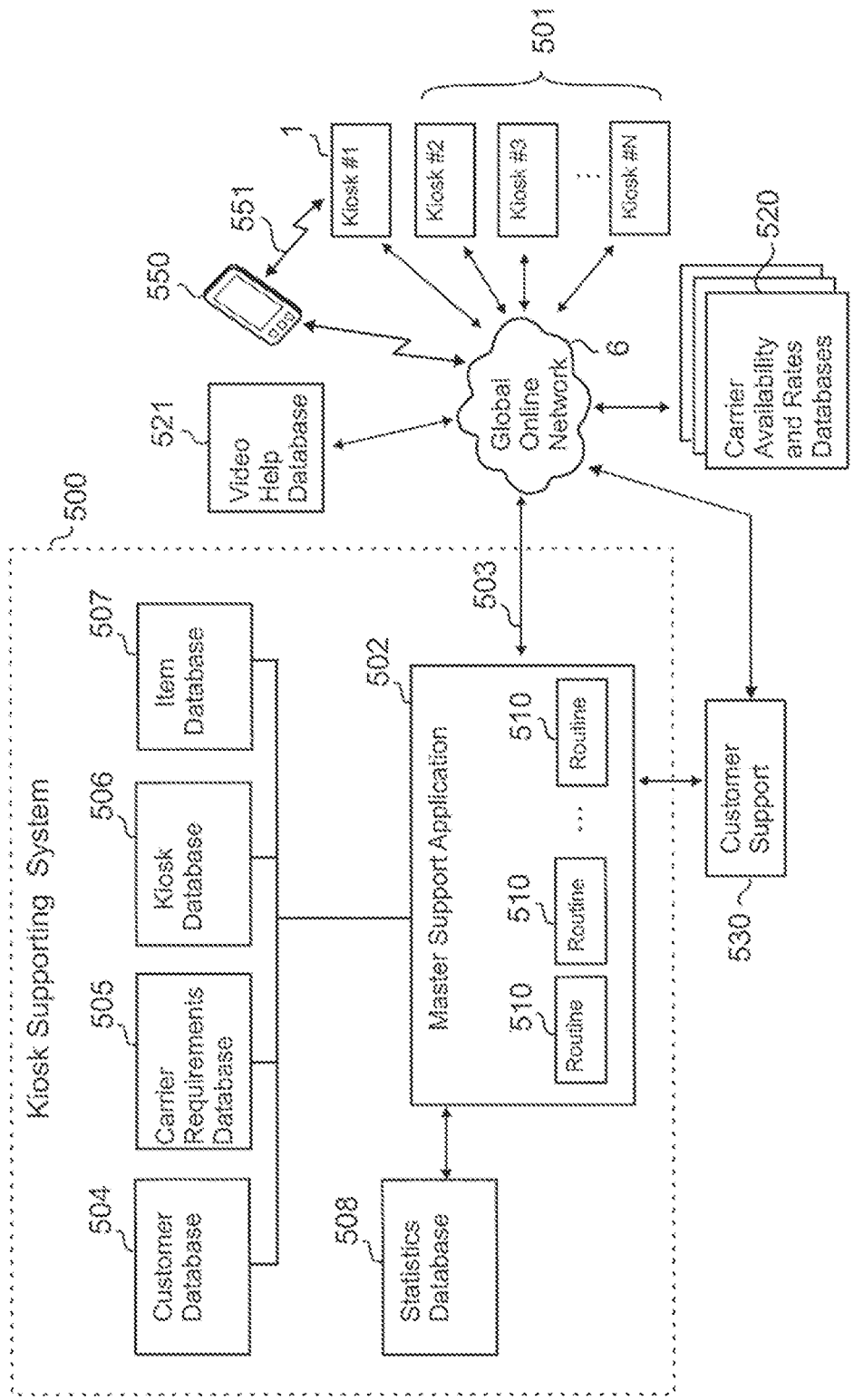
FIG. 4 is a block diagram of the primary components of a kiosk support system.

Referring now to FIG. 4, there is shown a block diagram of the primary components of the online kiosk support system 500 which provides management to the kiosk 1 among other kiosks 501 typically at different locations via the online global computer network 6. The online kiosk support system can be a cloud-based system including a master support application 502 managing communication 503 with each of the kiosks and customer and/or vendor mobile devices 550. It shall be understood that some communication 551 can be direct between the customer and/or vendor mobile devices and the kiosk by way of the kiosk's NFC device or other wireless communication system.

The master support application 502 can include various software routines 510 for accessing and updating various system controlled databases, such as: a customer database 504; a carrier requirements database 505; a kiosk database 506; an item database 507 for tracking item properties, such as dimensioning and weight, and item status, such as its location in the SAR subsystem, or that it has already been retrieved by a carrier or customer, and other item-related metadata; a statistics database 508 for tracking various kiosk and customer metrics; and, non-system controlled databases such as a carrier availability and rates database 520 for example. The master support application can manage access to a video help database 521, and other forms of customer support 530, such as online chat, and telephone.

It shall be understood that the various subsystems of the automated self-service item preparation for shipping system 90 can be operated in a stand-alone manner or in combination with one or more other subsystems in order to provide an enhanced item shipping preparation experience for a customer or other user. For example, the herein-described item measurement subsystem can be used to inform personnel at an office service outlet, such as at a The Office Boss brand outlet, about the dimensions of an item being prepped for shipping.

Figure 5:
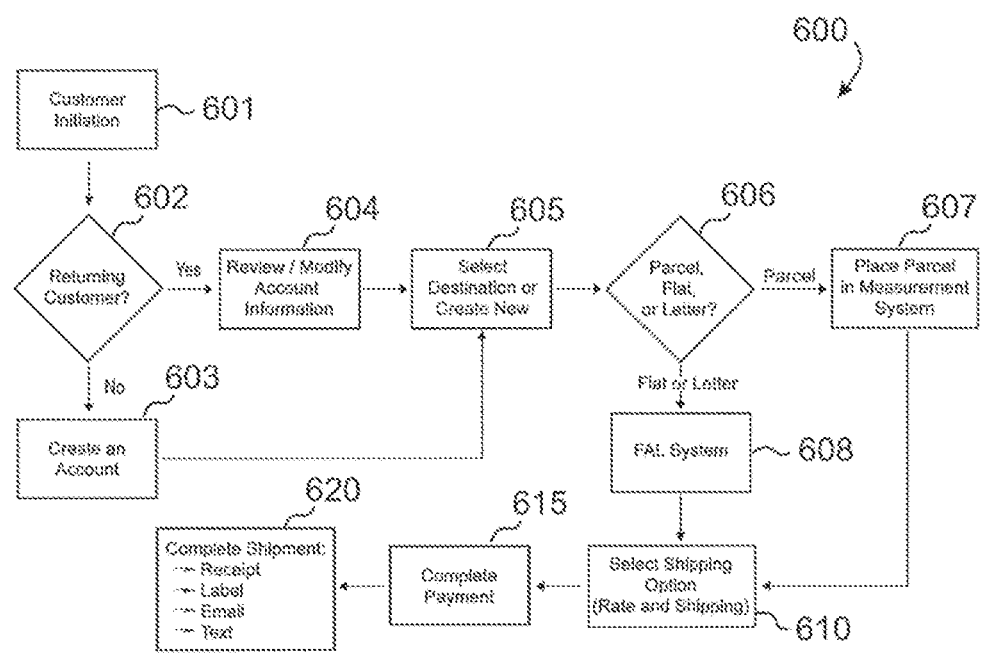
FIG. 5 is a flow chart diagram of an example transaction by a customer of the shipping item preparation system.

FIG. 5 shows a flow chart diagram of an exemplary customer transaction 600 using the above-described shipping item preparation system 90 according to an exemplary embodiment of the invention. For example, a human customer 20 can initiate a transaction 601 either through the direct input using the touch screen monitor 31 at the kiosk's customer interface station 3, or by accessing the kiosk's customer interface subsystem 200 using an app running on the customer's mobile device 29 communicating through the kiosk's NFC device 35. The customer can make a selection of status 602 as a new or returning customer. A new customer can be led through an account creation routine 603. A returning customer may gain authorization either through their mobile device, their credit card, or through entering a secure login routine on the touch screen monitor 31. As a returning customer, that customer's records can be obtained from the customer database 504. The customer can update information in their record 604. For example, a customer's "ship-from" information can be recalled and referenced for modification if desired. Past "ship-to" destinations can be illustrated on a map displayed on the monitor for easy (recurring) shipping options, whereupon the customer can select an old destination or input a new one 605. Once the "ship from" and "ship-to" information is verified, the customer can be instructed select whether the item is a parcel, a flat or a letter 606. Alternatively, the system can detect whether a flat has been inserted into the flats subsystem acceptance station 5, or whether the customer is attempting to use the item acceptance and dispensing station 4, and make the determination on its own. If the customer has not already placed the item in the either the flats and/or letter subsystem acceptance station or the item acceptance and dispensing station, the system will direct the customer to do so according to the item to be sent.

If the item is a flat, the flats subsystem 300 can be used to determine the dimensions and weight of the item. If the item is a parcel, the item can be placed 607 so that the measurement subsystem 100 measures and weighs the item. Either system can generate data values of those properties for the item. Dimensional and weight data values can then be used by the item shipping preparation system 90 to determine rate and shipping options. Further, the system can connect to the shipping carriers' databases 520 for rate and shipping option updates. Upon presentation of this data to the customer, the customer's selection of a shipping option 610 leads to a payment options routine 615 which accesses or otherwise obtains credit card, online account, or other payment options and funds availability verification. Upon completion of payment, the transaction is finalized 620 by the system updating the various databases with records reflecting the transaction and by the printing of a shipping label which can be attached to the outgoing parcel.

Attachment of a shipping label can be accomplished automatically by the item measurement subsystem 100 or by the storage and retrieval subsystem 400, or for those systems in which the customer applies the label, the item can be returned to the customer to apply the printed label to the item before it is forwarded to the storage and retrieval subsystem. The customer can select a receipt type (printed or emailed), which can include an optional QR code for later scanning to provide access to shipping status information such as tracking.

After the customer transaction is completed, the item can be retained within the kiosk for later pickup by the selected carrier. The storage and retrieval subsystem 400 can handle routing and placement of the item in a storage location cubicle using the matrix storage mechanisms described above. The label applied to the item can include cubicle storage location information along with other collected data regarding the item. This collected data can include "ship from" information, such as the customer name and address accessed from the item or customer databases, "ship to" information, such as the destination name and address, item dimension data, item weight, shipping carrier identity, pricing and shipping details, dates and times, one or more item images as generated by the item measurement subsystem, and an optional customer image taken, for example, at the time of the kiosk transaction using the camera 34 of the customer interface station 3. The exact details regarding the location of storage such as the particular kiosk, its address, can be recorded in the item status database 507. Notices can be sent via email, text, or through the carrier online shipping system 51, 52, 53 to the selected carrier regarding the kiosk identity and location, item location within the kiosk, the item's status, and one or more security codes to gain access to the kiosk or to have an item retrieved.

The carrier can dispatch a service person to retrieve the item from the kiosk. After a login procedure is completed by the service person, if not already provided with the security code and password associated with an item, they can be given the security code, password and an image of the item or items to be collected, and their locations within the kiosk, whether in the array 405 itself or in the carrier retrieval area 430. The item storage and retrieval subsystem can record the item dissemination status, time, date and carrier details as part of the total data collected on each item, and the appropriate databases can then be updated. An image of the service person can also be collected and stored. An email, text, or other notification can be sent to the customer indicating the item status along with a carrier tracking number.

The automated self-service shipping preparation system software can provide the customer with a series of display screen or pages including information and forms for inputting or confirming information and to provide customer feedback. The forms can be provided through interactive screens which allow the customer to complete the required information and respond appropriately to each set of entry requirements in order to successfully complete the shipping preparation process.

Figure 6:
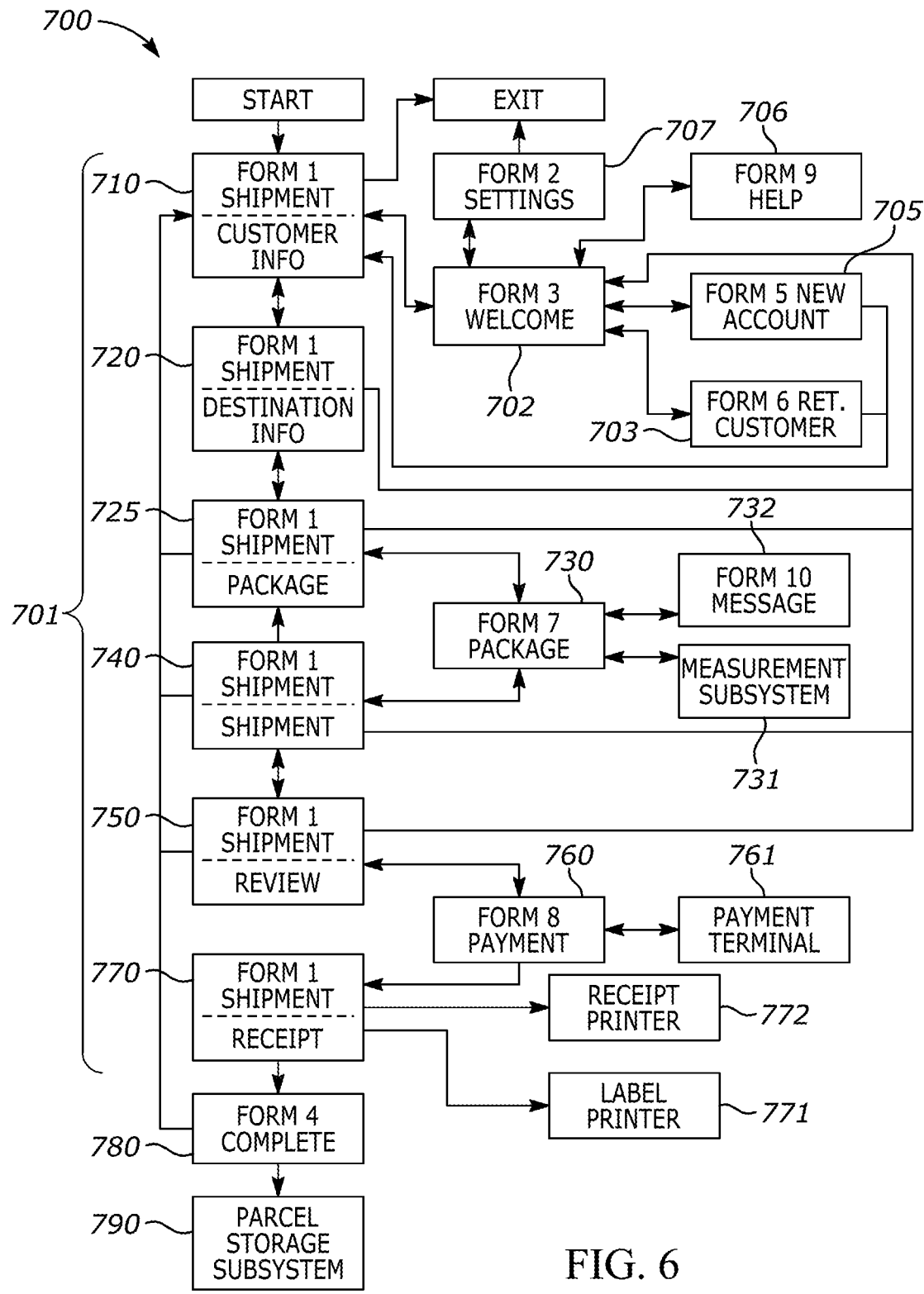
FIG. 6 is a flow chart diagram of customer entry and feedback forms during the exemplary transaction.

Referring now to FIG. 6, there is shown a flow chart diagram illustrating an exemplary software process 700 for displaying to the customer various data display and entry forms as shown in FIGS. 7-20.

It shall be understood that the software, upon customer completion of data entry on each form, can initiate communications and interface procedures with one or more subsystems, or institute a network application programming interface (API) call in order to communicate the information appropriately within the process. It shall be understood that two-directional arrows are used in the flow chart to indicate the process can involve a two directional communication of data.

The software process goal can be to obtain a properly filled out shipment form referred to as "Form 1" which will contain all the information necessary to complete the transaction for shipment of an item. This can include a number of steps 701 typically requiring interaction from the customer and operation by the system components. The information for Form 1 can be subdivided into six screens indicated as Forms 1-1 through 1-6 in FIGS. 12, 13, 14, 16, 17 and 19, respectively.

Figures 7, 8:
FIG. 7 is an exemplary welcome screen of a customer interface station displayed during the exemplary transaction of FIG. 6.
FIG. 8 is an exemplary returning customer form page of the customer interface station that may be completed by a customer that has previously used and/or registered with the kiosk.

Typically, as far as the customer is concerned, however, the system will first display a welcome screen or page (Form 3) at step 702, as shown in FIG. 7 where the customer can select whether she is a returning customer 791 or a new customer. A new customer can setup a kiosk account 792 or proceed as a guest 793 without setting up an account. A customer can also ask for help 794. A returning customer can be taken to Form 6 at step 703 where the customer can log in as shown in FIG. 8. As illustrated in FIG. 8, the returning customer can choose to enter either a last name, company name or customer ID 800. If the last name is selected, the form indicates where the last name 802 should be entered along with a password 804. If a company name was selected, then last name 802 would be changed to "COMPANY NAME" and if a customer ID was selected then last name 802 would be changed to "CUSTOMER ID"

A new customer can be taken to a create new kiosk account screen or page (Form 5) at step 704 to create a new account as shown in FIG. 9. As illustrated in FIG. 9, the customer would enter identifying information 900, including their country of residence, first and last name, company name (if applicable), address, phone number and email address. As further described herein the country and state may be set by default. Address information may also be entered by accessing a map via the maps button 904. Once a location on the map was selected, the corresponding address information could be automatically entered into Form 5. The customer would then create and verify a password 902. During the creation or accessing of a customer account the customer can receive help at step 706 from Form 9 as shown in FIG. 10.

An administrator, such as an employee of a The Office Boss brand outlet can access settings for the kiosk at step 707 from the settings screen or page in Form 2 as shown in FIG. 11. There can be a number of tabs in Form 2 that allows the administrator to access different settings, such as a general tab 1100, a receipt layout tab 1102, an accounts tab 1104, and a store information tab 1106. Within the general tab 1100, the administrator can designate which database may be used for storing data generated by the kiosk, turn sound on or off, enter or change the name of the kiosk, enter a default state/country (although only state is shown), enter a weather city, which may be the city in which the kiosk is located to provide weather information on the display, which may be relevant to carrier pickup and delivery, designate the printers for labels and receipts, print test labels and receipts and see statistical information related to usage of the kiosk. The receipt layout tab 1002 allows the administrator to change aspects of the layout of the receipts to be printed. The accounts tab 1104 allows the administrator to access information about the different accounts created on the kiosk. The store information tab 1106 allows the administrator to enter and change information about the store, such as hours of operation, products available for sale, etc.

Figure 12:
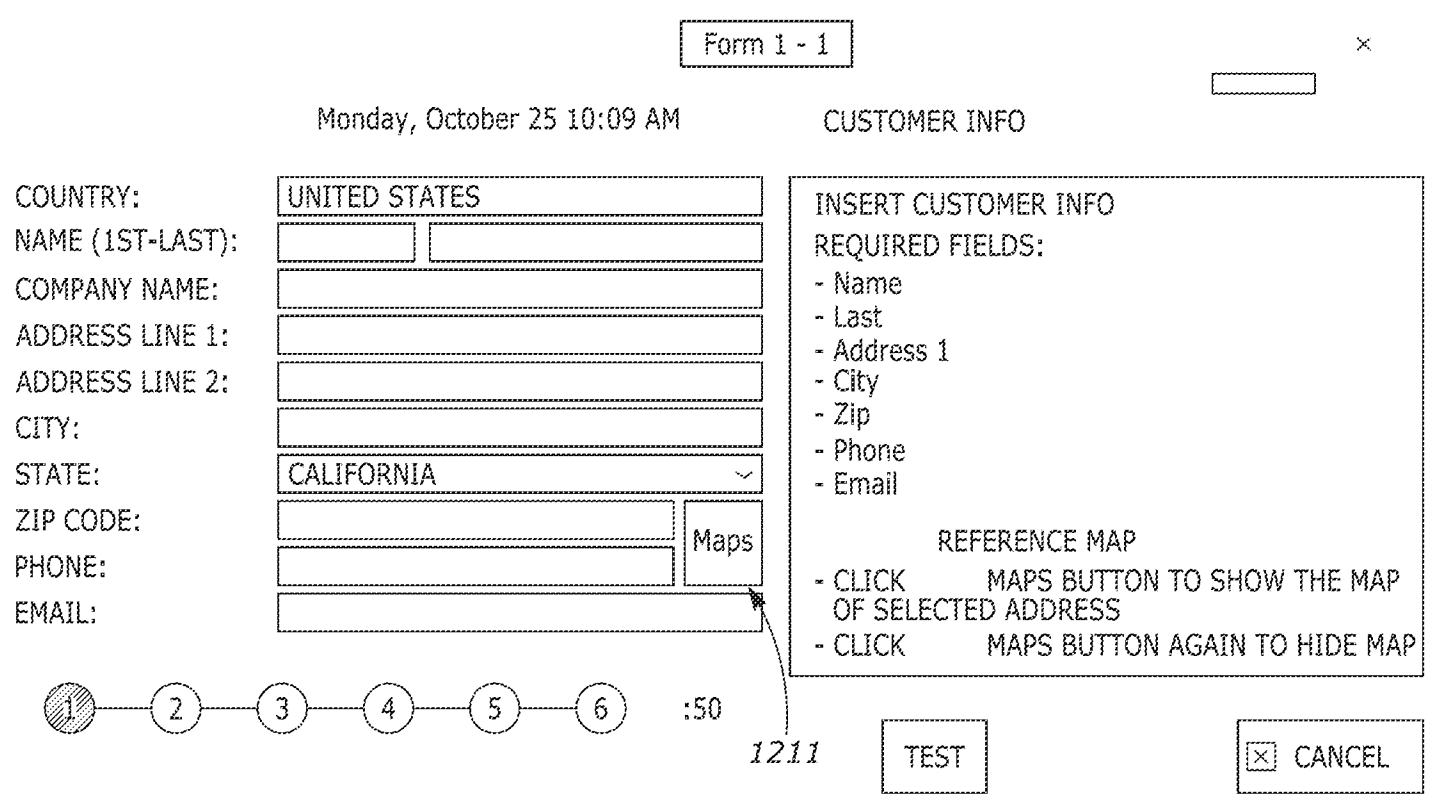

The result of the customer login or the acceptable creation of a new customer account can be the displayed at step 710 of Form 1-1 as shown in FIG. 12. If a customer were proceeding as a guest, the same identifying information 900 from FIG. 9 may be input. The name and address fields can be prepopulated and allow the customer to make changes. Data entered by the customer can be checked in real-time online to verify the veracity of the supplied information. For example, the agreement between a supplied city name and its zip code can be verified for accuracy. Aids can be given to help the customer enter such data. For example, given a city name, the software can provide a pull-down menu of applicable zip codes. In addition, a graphical map reference pop-up can be provided to facilitate the customer in locating the correct destination address by selecting the map button 1211 as shown in 711.

Figure 13:
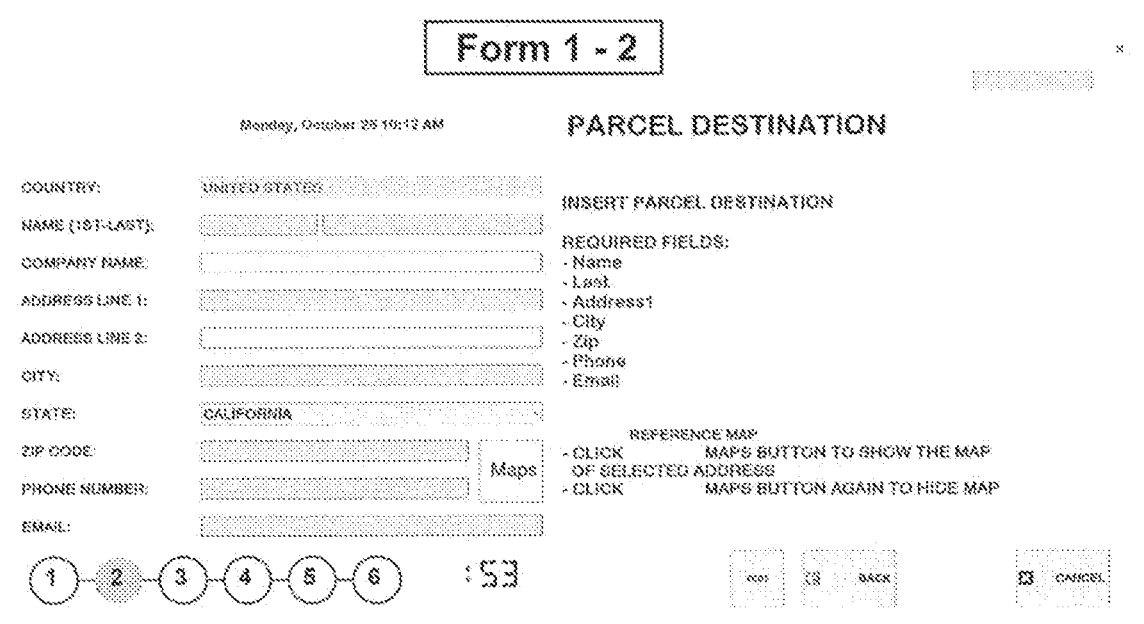

Similarly to the customer information portion of Form 1, namely Form 1-1, the Destination information can be added at step 720 using Form 1-2 as shown in FIG. 13. Again, previously used destinations can be searched and selected by the customer, or a new destination can be added in the same manner that identifying information 900 from FIG. 9 is input. Entries can be similarly checked for accuracy, and a graphical map can be referred to as an aid.

Once a proper destination has been entered, the item details can be determined at step 725. Form 1-3/Form 7 as shown in FIG. 14 can be displayed showing the item details. The item can be referred to as a "package" in the process shown in FIG. 6 and as a "parcel" in the forms. Typically, the item will be scanned by the Item Measurement Subsystem at step 731 and the results displayed on the form 7 at step 730. During the scan Form 10 as shown in FIG. 15 can be displayed at step 732 indicating the customer must wait until the weight and dimension information collection process is completed. The customer can verify the result of the scan by accepting the weight and dimension information displayed. An image of the item 1400 can be shown in Form 7 to help the customer with the verification.

Figure 16:
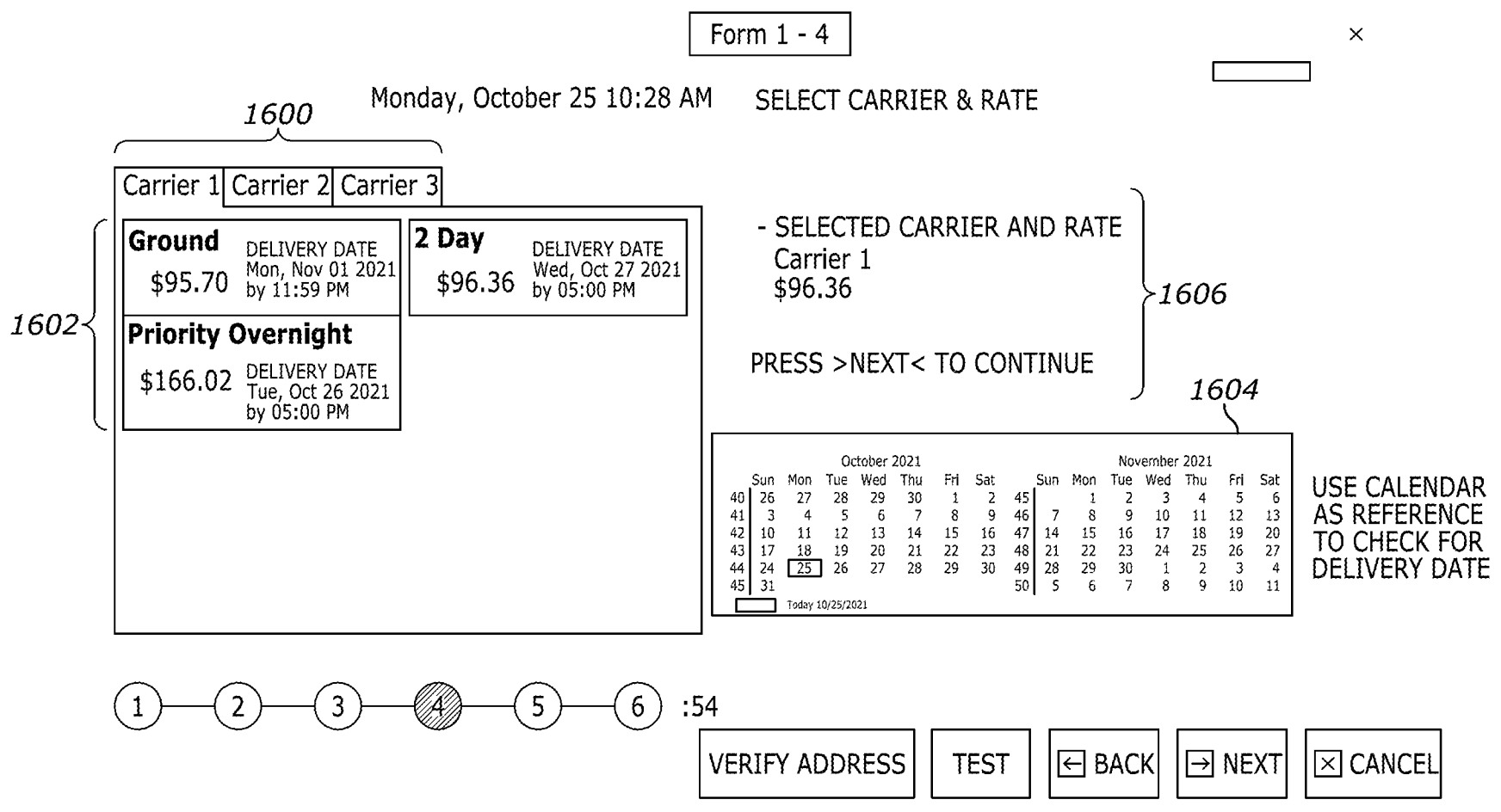

Once the appropriate item properties have been entered, the customer is given various shipping options at step 740 on Form 1-4 as shown in FIG. 16. Here the customer has a selection of shipping carriers that can be selected from different tabs 1600. The pricing and shipping options 1602 for each carrier can be viewed by selecting the appropriate tab 1600. A calendar 1604 may be used as a reference aide to check for a delivery date. The selected carrier and rate will be displayed in display area 1606

Figure 17:
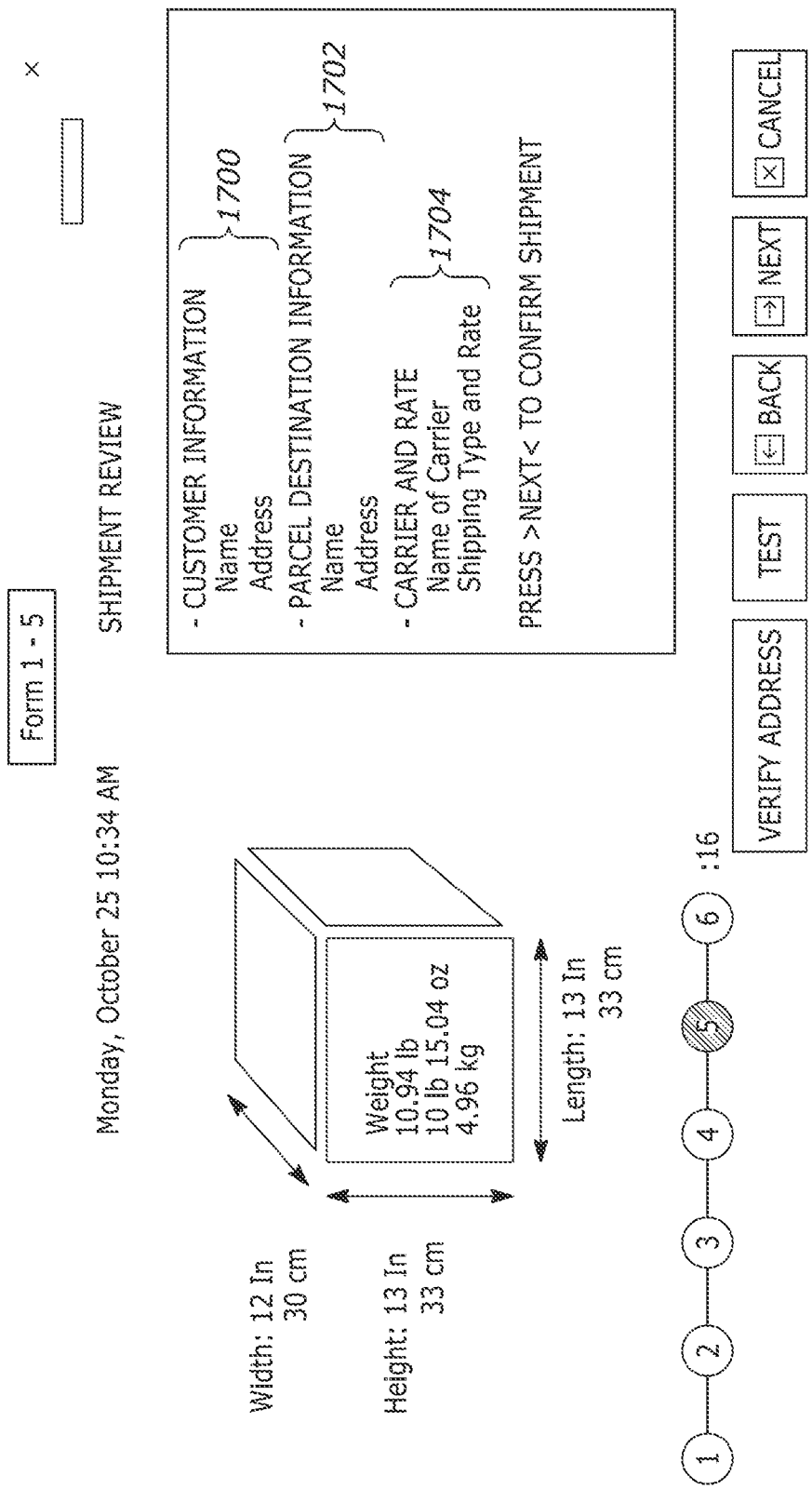
FIG. 17 is an exemplary shipment review page of the customer interface station.

Once shipping has been selected, the customer is given a final review screen at step 750 on Form 1-5 as shown in FIG. 17. The customer can verify and approve the so called "sent from" field 1700 and "send to" field 1702 and the carrier and rate information 1704 before proceeding.

Figure 18:
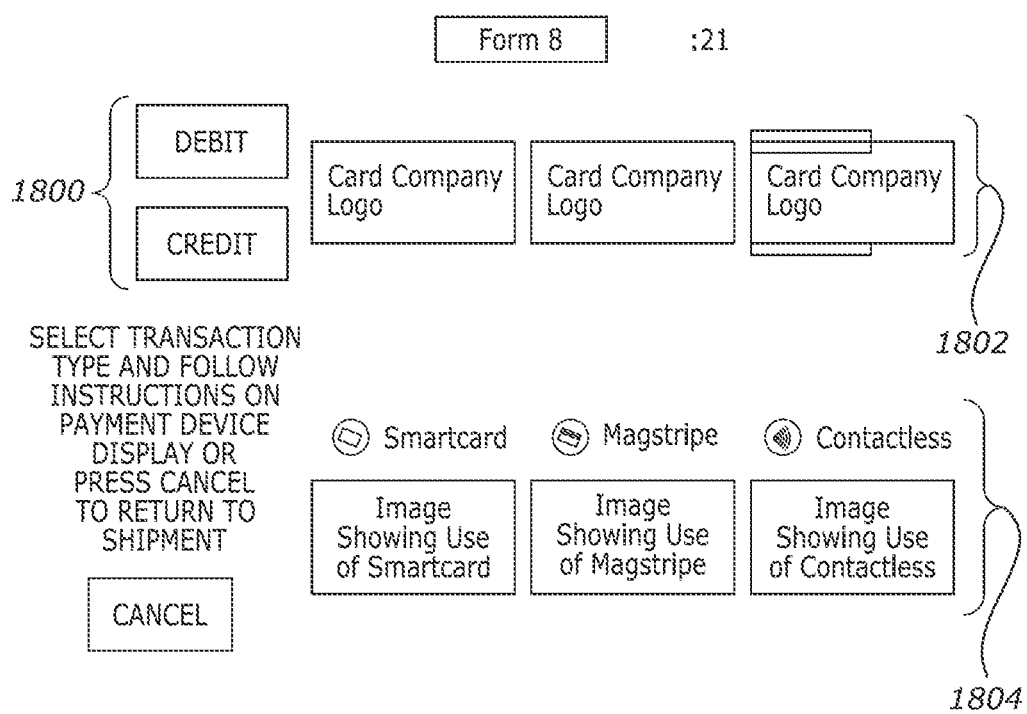
FIG. 18 is an exemplary payment page of the customer interface station.

Once the final review is complete and approved by the customer, a payment screen is displayed at step 760 on Form 8 as shown in FIG. 18 where the customer can select the type of payment, such as debit or credit 1800 or some other payment method not shown. Accepted payment vendor information 1802, such as a vendor/company name and/or logo, and methods for processing 1804, such smartcard, magstripe and contactless, can be shown. Completion of the selection will take the customer to the appropriate payment terminal at step 761.

Once payment has been verified the shipping carrier can be contacted via its online shipping system and an order placed. This can be through an online API interface with that carrier where all the necessary data from Form 1 is relayed. A response from the carrier system can contain a shipping confirmation and tracking number which can be added to the databases.

After shipping is confirmed, the customer can be given the option of selecting the type of receipt desired at step 770 on Form 1-6 as shown in FIG. 19. Upon selection of the receipt, i.e., email, printed, and/or QR code, pertinent information can be stored in the database and presented to the customer on the shipping labels at step 771 and receipts at step 772. Instructions 1900 for receipt selection may be provided and if a label needs to be attached to the parcel by the customer instructions for doing so can be provided. A shipping transaction complete screen 2000 is then displayed 780 on Form 4 as shown in FIG. 20.

At each stage of the shipping process the customer can be given options to proceed, cancel, go back to a previous form and change the data. For example, if the customer reaches the payment form at step 760, that interfaces with the payment terminal at step 761, and the customer realizes that they forgot their wallet, they may elect to cancel the shipping process and retrieve their parcel from the item measurement subsystem. Further, once the transaction is complete, the system engages the item storage and retrieval subsystem in step 790 in order to store the item for later pick up by the selected carrier.

It shall be understood that the above software process can be implemented on the customer interface subsystem computer or implemented in whole or in part by an application running on the customer's mobile device in communication with the customer interface subsystem via the NFC device.

While the exemplary embodiments of the invention have been described, it should be understood that modifications can be made and other embodiments may be devised without departing from the spirit of the invention and the scope of the appended claims.

What is claimed is:

1. A system for the automated preparation of an item for shipping, said system comprising:
 a stand-alone kiosk;
 a computer housed in said kiosk, the computer exchanging electronic communications with an online network to provide real-time item tracking and storage information with a remote carrier shipping system connected to the online network;
 a customer interface system, comprising of one or more processors and including a customer interface terminal physically housed with said stand-alone kiosk and adapted to receive customer inputs and generate an item properties record;
 a data feedback device including a display physically housed within said kiosk and coupled to said computer for communicating instructions to a user on how to operate said system to process said item for shipping;
 a data entry device coupled to said computer for receiving input from said user to operate said system to process said item for shipping;
 an item properties measurement subsystem within said kiosk and coupled to said computer for generating said item properties record, wherein the item properties measurement subsystem optically scans said item to update the item properties record with a digital data record indicative of dimensional measurements of said item;
 a printer housed in said kiosk capable of printing a label associated with said item;
 a computer program run on said computer that determines a shipping rate for said item responsive to said item properties record, generates said label responsive to input indicative of shipping data entered at the data entry device, updates said item properties record with shipping data, and controls said printer to print said label;
 an automated item storage and retrieval subsystem physically contained within said kiosk for securely sorting and storing said item, wherein the automated item storage and retrieval subsystem comprises a robotic arm with a grasping head, wherein the automated item storage and retrieval subsystem:
  affixes said label to said item based on the digital data record,
  notifies the remote carrier shipping system with the updated item properties record including the shipping data,
  transports, by the robotic arm, the item to a first secure location within the kiosk, the first secure location determined by the digital data record,
  generates an electronic communication to the computer to update a position of the item at the first secure location, and
  automatically retrieves, by the robotic arm, the item in response to an electronic communication from the computer, wherein the electronic communication is generated responsive to a security verification performed by the computer; and
 a computer program run on the computer housed in said kiosk, wherein the computer provides operational control for the customer interface system, said item properties measurement system and said automated item storage and retrieval system, wherein said computer program calculates a rate based on a ship to location input to said customer interface system, said dimensional measurements of said digital data record, and an item weight data record.

2. The system of claim 1, wherein said item properties measurement subsystem including:
 an item dimension measurement unit; and,
 a scale.

3. The system of claim 1, wherein said automated item storage and retrieval subsystem identifies and locates said item among other items for pick up by a carrier or a customer.

4. The system of claim 1, wherein said automated item storage and retrieval subsystem stores each item in a physically separate and uniquely identified area within a storage matrix.

5. The system of claim 1, further comprising an automated labeler for affixing said label to said item prior to storage.

6. The system of claim 1, wherein said computer communicates with a mobile device to supplement said data feedback device and said data entry device.

7. The system of claim 6, further comprising a near field communication device coupled to said computer, wherein said near field communication device communicates with said mobile device.

8. The system of claim 1, wherein said computer program provides a notification to a carrier selected by said user among a plurality of carriers when said item is ready for pickup.

9. The system of claim 1, further comprising a second printer housed in said kiosk capable of printing a receipt including a tracking code for tracking said item during shipping.

10. A system for the automated preparation of a three-dimensional item for shipping, said system comprising:
 a standalone housing;
 a customer interface system including a customer interface terminal physically housed with said housing and adapted to receive customer inputs and generate an item properties record;
 a database accessible by said customer interface system;
 an item properties measurement system including:
  a three-dimensional item measurement unit capable of generating an item dimensional properties data record, wherein the three-dimensional item measurement unit optically scans said item to generate the item dimensional properties data record, and updates the item properties record with the item dimensional properties record;
 a printer housed in said kiosk capable of printing a shipping label associated with said item;
 a computer program run on said customer interface that determines a shipping rate for said item responsive to said item properties record, generates said shipping label responsive to input indicative of shipping data entered at the data entry device, updates said item properties record with shipping data, and controls said printer to print said shipping label; and a scale capable of generating an item weight data record;

an automated item storage and retrieval subsystem for physically sorting and securely storing said item within said housing, wherein the automated item storage and retrieval subsystem comprises a robotic arm with a grasping head, and wherein the automated item storage and retrieval subsystem:

affixes said label to said item based on the digital data record, notifies the remote carrier shipping system with the updated item properties record including the shipping data, transports, by the robotic arm, the item to a first secure location within the kiosk, generates an electronic communication to the customer interface system to update a position of the item at the first secure location, and automatically retrieves, by the robotic arm, the item in response to an electronic communication from the customer interface system, wherein the electronic communication is generated responsive to a security verification performed by the computer; and a computer program run on a computer providing operational control for said customer interface system, said item properties measurement system and said automated item storage and retrieval system, wherein said computer program calculates a rate based on a ship to location input to said customer interface system, said item dimensional properties data record and said item weight data record.

11. The system of claim 10, wherein said automated item storage and retrieval system identifies and locates said item among other items for pick up by a carrier or a customer.

12. The system of claim 11, wherein said automated item storage and retrieval system stores each item in a physically separate and uniquely identified area within a storage matrix.

13. The system of claim 10, further comprising an automated labeler for affixing a label to said item prior to storage.

14. The system of claim 10, wherein said customer interface system communicates with a mobile device to supplement said customer interface terminal.

15. The system of claim 14, further comprising a near field communication device coupled to said customer interface system, wherein said near field communication device communicates with said customer mobile device.

16. The system of claim 10, wherein said computer program provides a notification to a carrier selected by said user among a plurality of carriers when said item is ready for pickup.

17. The system of claim 10, further comprising a printer housed in said kiosk capable of printing a receipt including a tracking code for tracking said item during shipping.

18. The system of claim 10, wherein the customer interface system further comprises a display providing one or more of: shipment status, tracking information, and past shipment information.

19. A method for preparing a three-dimensional item for shipping by a common carrier, said method comprising:

executing a computer program on a computerized standalone self-service kiosk, the computer program providing operational control of a customer interface system, an item properties measurement system and an automated item storage and retrieval system, in response to user input entered at a user interface of the customer interface system, accepting an item for shipment into the computerized standalone, self-service kiosk;

optically scanning said item within said kiosk to determine a dimensioning of said item;

determining, by a scale within said kiosk, a weight of said item;

receiving, via selections entered at the user interface, shipping data comprising a destination, a carrier selection, and a rate selection;

generating an item properties record including said dimensioning, said weight, and said shipping data;

calculating, by the computer program, a rate based on said shipping data and said item properties record including said dimensioning, said weight, and said shipping data;

generating a label responsive to input indicative of shipping data entered at the data entry device;

automatically printing the label associated with said item and responsive to said item properties record;

affixing said label to said item based on the digital data record, notifying a remote carrier shipping system with an updated item properties record including the shipping data;

generating an electronic communication to cause an automated storage and retrieval system to determine a first secure location within the kiosk, and transport, by a robotic arm, said item physically to the first secure location;

receiving, at the user interface, a retrieval request by a carrier associated with said carrier selection;

performing an electronic security verification to authorize the retrieval request; and in response to authorizing the retrieval request, generating a second electronic communication to cause the automated storage and retrieval system to automatically retrieve, by the robotic arm, the item from the first storage location.

20. The method of claim 19, wherein said receiving including:

receiving from a mobile device running a software application capable of accepting said destination, said carrier selection, and said rate selection; and, wirelessly communicating between the mobile device and said user interface subsystem.

* * * * *